(12) United States Patent
Charssen Ge et al.

(10) Patent No.: US 8,705,728 B2
(45) Date of Patent: *Apr. 22, 2014

(54) SHARED PROTECTION SCHEME FOR MULTIPLE VARIABLE BATTERIES

(75) Inventors: Qiangsheng Charssen Ge, Macungie, PA (US); Elizabeth Ellen Perry, Reading, PA (US); David Paul Chabinec, West Lawn, PA (US)

(73) Assignee: Microsemi Semiconductor (U.S.) Inc., Aliso Viejo, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 12/885,906

(22) Filed: Sep. 20, 2010

(65) Prior Publication Data

US 2012/0069990 A1 Mar. 22, 2012

(51) Int. Cl.
*H04M 1/00* (2006.01)
(52) U.S. Cl.
USPC .......................................... 379/412; 379/413

(58) Field of Classification Search
USPC ............................ 379/29.03, 29.04, 412, 413
See application file for complete search history.

(56) References Cited

U.S. PATENT DOCUMENTS

| | | | | |
|---|---|---|---|---|
| 4,440,980 A * | 4/1984 | Bakker | ......................... | 379/395 |
| 6,922,323 B1 * | 7/2005 | Bentley | ......................... | 361/119 |
| 2003/0053276 A1 * | 3/2003 | Mutunga et al. | .............. | 361/119 |
| 2009/0092243 A1 * | 4/2009 | Mitrea et al. | .................. | 379/412 |

* cited by examiner

*Primary Examiner* — Fan Tsang
*Assistant Examiner* — Akelaw Teshale

(57) ABSTRACT

A device includes a plurality of subscriber line interface circuits and a shared protection device. Each subscriber line interface circuit has a voltage input terminal and first and second interface line terminals. The shared protection device is coupled to the interface line terminals and operable to sense a negative reference voltage representing a most negative one of the voltages present on the voltage input terminals and to provide overvoltage protection responsive to a voltage on at least one of the interface line terminals exceeding the negative reference voltage.

19 Claims, 1 Drawing Sheet

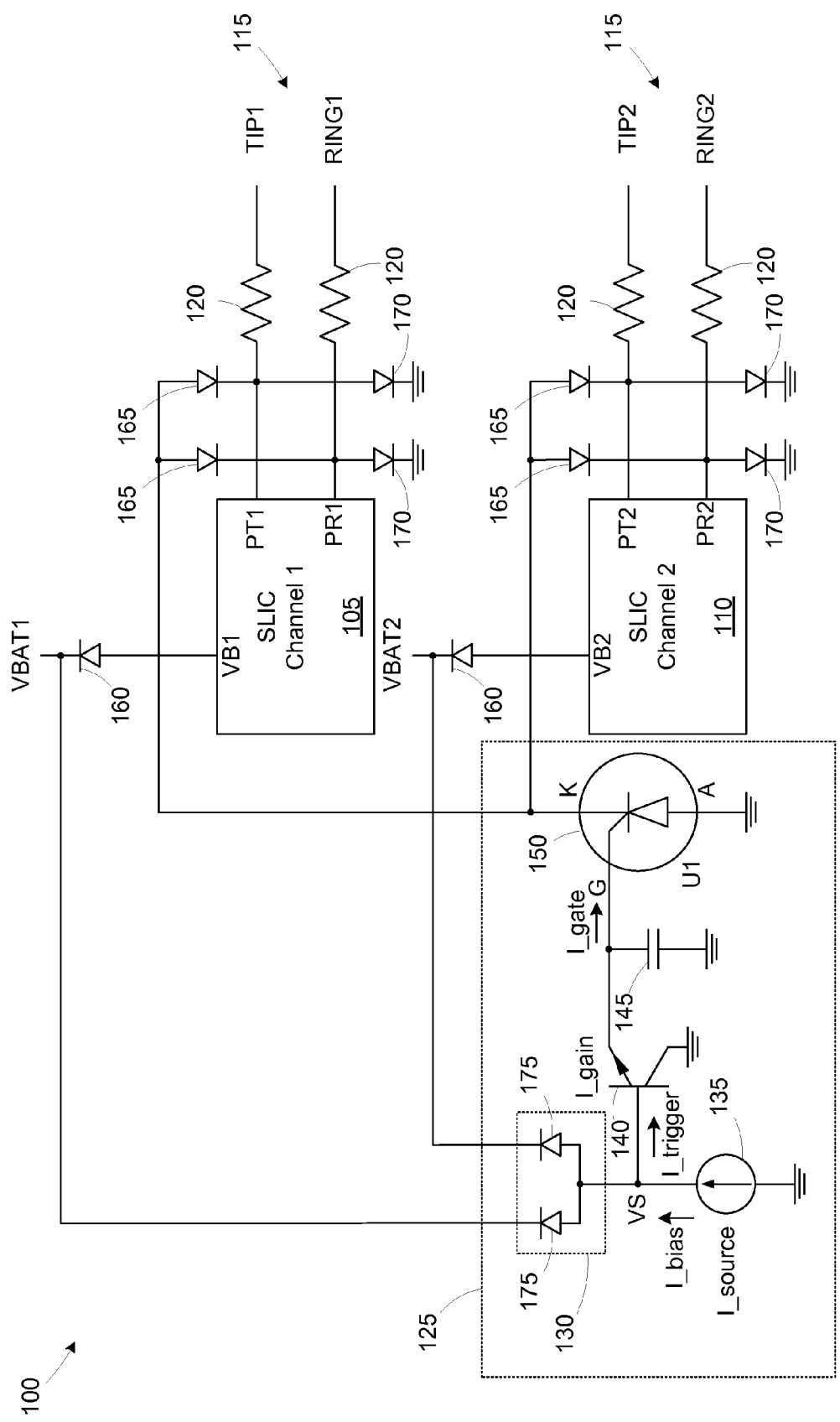

SHARED PROTECTION SCHEME FOR MULTIPLE VARIABLE BATTERIES

CROSS-REFERENCE TO RELATED APPLICATIONS

Not applicable.

BACKGROUND

The disclosed subject matter relates generally to telecommunications and, more particularly, to a shared protection scheme for multiple variable batteries.

In communications systems, particularly telephony, it is common practice to transmit signals between a subscriber station and a central switching office via a two-wire bi-directional communication channel. A device at the subscriber station, such as a cable modem, typically implements one or more subscriber line interface circuits (SLICs) for interfacing with the subscriber line.

The SLIC provides an interface between a low voltage signal path in the subscriber premise and a high-voltage telephone subscriber line. The SLIC provides functions such as off hook detection, ringing signal generation, and battery feed to the subscriber line. The subscriber line consists of a telephone transmission line, including two conductors referred to as A and B or tip and ring, and the subscriber telephone equipment coupled across the tip and ring conductors (i.e., the load). The subscriber line and the subscriber telephone equipment are also referred to as a subscriber loop.

The subscriber premises device generates battery voltages for the operation of the SLICs. The battery voltage is a DC voltage supplied to the SLIC to power the SLIC and the subscriber line. The SLIC supplies a DC current at the battery voltage to the subscriber line. Superimposed on the DC current are AC signals of audio frequency by which information is conveyed between the subscriber and the central office or a local premise device, such as a cable modem.

It is common to use multiple battery voltages in the SLIC, such as a positive battery, VBP, and a negative battery, VBH. To save power and reduce power dissipation on the SLIC for short loop applications, a third supply is often used for DC feed along with VBH. The third supply is typically lower in amplitude than VBH, and is often referred to as VBL.

In some applications, one negative battery (e.g., VBL1) is used to power a first channel, and a second negative battery (e.g., VBL2) is used to power a second channel. For example, cable modems may be implemented using this technique, where a dual-channel modem may have two SLICs, or separate cable modems may operate on the same subscriber line. Each battery provided to the SLIC (e.g., by a device such as a cable modem) will dynamically vary its amplitude or value according to the SLIC operation condition.

To protect the SLICs from voltage excursions, such as lightning surges or power cross events, a protection scheme is employed to connect the tip or ring lines experiencing the event to ground. Because of the different voltages used, one protector is typically employed to track the VBL1 supply and another protector is employed to track the VBL2 supply. Each protector includes protection circuitry and a gate capacitor to handle fast transients. This multiple-protector protection scheme is costly, since each channel requires its own protector and a relatively expensive gate capacitor.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a device including a plurality of subscriber line interface circuits and a shared protection device. Each subscriber line interface circuit has a voltage input terminal and first and second interface line terminals. The shared protection device is coupled to the interface line terminals and operable to sense a negative reference voltage representing a most negative one of the voltages present on the voltage input terminals and to provide overvoltage protection responsive to a voltage on at least one of the interface line terminals exceeding the negative reference voltage.

Another aspect of the disclosed subject matter is seen in a method for protecting a device including a plurality of subscriber line interface circuits each having a voltage input terminal and first and second interface line terminals. The method includes dynamically sensing a negative reference voltage representing a most negative one of the voltages present on the voltage input terminals and grounding the interface line terminals responsive to a voltage on at least one of the interface line terminals exceeding the negative reference voltage.

BRIEF DESCRIPTION OF THE SEVERAL VIEWS OF THE DRAWINGS

The disclosed subject matter will hereafter be described with reference to the accompanying drawings, wherein like reference numerals denote like elements, and FIG. 1 is a diagram of a protection circuit for a device operating on multiple channels with multiple voltage sources.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a simplified diagram of an exemplary device 100 including a plurality of subscriber line interface circuits (SLICs) 105, 110. Only the elements of the device 100 used to support a protective function for SLICs 105, 110 are shown. Although a two-channel embodiment is illustrated, the concepts described herein may be expanded to cover multiple channels with multiple battery supplies. Each SLIC 105, 110 has PT and PR input terminals for the tip and ring lines, respectively, and a VB input terminal for the VB reference voltage. Multiple interface lines 115 are represented in FIG. 1 (i.e., designated as TIP1-n and RING1-n). Each interface line 115 has protection resistors 120.

A shared protection device 125 is employed to protect the multiple interface lines 115. The shared protection device 125 includes a voltage sense element 130, a current source 135, a gain unit 140, a gate capacitor 145, and a protection element 150. Isolation diodes 160 are provided on the VB input terminals of the SLICs 105, 110 to help to trigger the shared protection device 125. Without the diodes 160 (i.e., VB sinks current for normal operation and cannot source current), the VB supply can be pulled more and more negative without the shared protection device 125 being triggered. Steering diodes 165 are provided to isolate the tip and ring lines from one another during normal operation. Protection diodes 170 provide positive voltage protection for the tip and ring lines. For positive transients on the TIP and/or RING lines, the voltage(s) at the affected PT/PR input terminals will go positive as the voltage on the protection resistors 120 goes positive. The protection diodes 170 will activate to ground the affected interface line 115 and keep the voltage on the PT/PR input terminals no more than a diode drop above ground.

The voltage sense element 130 operates to dynamically sense which of the multiple variable batteries in the device 100 is the most negative, so as to prevent false protection events. For simplicity, FIG. 1 and the description are directed to an embodiment with two variable batteries, although the technique may be applied to any number of batteries. The voltage at the node, VS, is sensed by diodes 175 and represents the more negative voltage provided by the two batteries, VBAT1 and VBAT2. Hence, VS represents a negative reference voltage to which the triggering of the protection element 150 is referenced. However, the diodes 175 block any current from flowing to the gate of the protection element 150. Without a triggering current, the protection element 150 could not activate and provide protection. Hence, the current source 135 is provided to generate a pre-biased source current to trigger the protection element 150. Because the pre-biased current from the current source 135 is always present and running off the more negative battery, it consumes power. The gain unit 140 provides a second stage amplification function to reduce the pre-bias current. For example the gain provided by the gain unit 140 may be on the order of 1000. Hence, the pre-bias current and the amount of power consumed are decreased by a factor of 1000. The current source generates a current, I_source, which is provided to the gain unit 140 to generate an amplified current, I_gain that is fed to the gate of the protection element 150. The current source 135 may be a fixed current source, or as simple as a resistor coupled between the sensing node, VS, and ground. The gain unit 140 may be implemented using a single transistor as illustrated, or may be constructed using various other arrangements, such as a Darlington pair of transistors. The protection element 150 may be implemented by a semiconductor-controlled rectifier (SCR).

When a negative transient takes the K node (i.e., the cathode) of the protection element 150 more negative than VS and the voltage drop through the gain unit 140, the protection element 150 will turn on, provided that the gate current is sufficient The gate trigger current, I_gate, is partially supplied from I_bias, represented by I_trigger and amplified by the gain, I_gain of the gain unit 140. The required bias current is:

$$I\_bias \geq I\_trigger = I\_gate/I\_gain.$$

The operation of the protective function in the device 100 of FIG. 1 is now described. For a positive transient on Tip or Ring, the protection diodes 170 clamp the voltage on PT or PR to one diode drop above ground. For a negative transient on Tip or Ring, the steering diodes 165 will communicate the voltage to the protection element 150 (i.e., the K terminal) such that the voltages on PT or PR will not be more negative than the more negative of VBAT1 and VBAT2 plus about a diode drop before the protection element 150 turns on and takes PR and PR to ground. In general, PT and PR are protected to be within a diode drop above ground and a diode drop below the most negative supply.

Assuming for purposes of this illustration, that Channel 1 is off hook with VBL1=−20 V and Channel 2 is on hook with VBL2=−60 V, a negative transient on TIP1 will take PT1 through the protection resistor 120 in a negative direction. Eventually, the isolation diode 160 will become reverse biased, and the Channel 1 SLIC 105 will be more negative than −20 V. The steering diode 165 on the TIP1 line remains reverse biased. Since VS is about −60 V plus a diode drop, the protection element 150 will not be immediately triggered.

Further progress in the negative transient on the TIP1 line will continue to take the SLIC 105 increasingly negative. At some point, through the steering diode 165 on the TIP1 line, the node K will be sufficiently negative relative to the voltage on the gate G, and the protection element 150 will begin to conduct current. As the voltage at node K becomes further negative, and with sufficient current sourcing, the gate of the protection element 150 will turn on, taking PT1, PT2, PR1, and PR2 to ground through the steering diode 165.

The gate capacitor 145 is generally provided to handle fast transients, such as a lightning surge, to immediately source the gate current. Since there is only one protection element 150, only one gate capacitor 145 is employed.

Protecting the SLICs 105, 110 from negative transients using the protection element 150 reduces the cost of the device 100 by reducing the number of protection devices and their associated gate capacitors. Printed circuit board area savings is also achieved. These advantages may be realized with minimal impact to the overall operation of the device 100.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A device, comprising:
a plurality of subscriber line interface circuits each having a voltage input terminal and first and second interface line terminals; and
a shared protection device coupled to the first and second interface line terminals of all of the subscriber line interface circuits and operable to sense a negative reference voltage representing a most negative one of the voltages present on the voltage input terminals and to provide negative overvoltage protection by grounding all of the first and second interface line terminals of all of the subscriber line interface circuits responsive to a voltage on at least one of the interface line terminals exceeding the negative reference voltage in a negative direction.

2. The device of claim 1, wherein the shared protection device comprises a protection element having a gate terminal coupled to receive the negative reference voltage and a first terminal coupled to the interface line terminals.

3. The device of claim 2, wherein the protection element comprises a semiconductor-controlled rectifier.

4. The device of claim 2, wherein the shared protection device further comprises a gate capacitor coupled to the gate terminal.

5. The device of claim 2, wherein the protection element has a second terminal coupled to ground.

6. The device of claim 2, wherein the shared protection device comprises a voltage sense element coupled between the voltage input terminals and the gate terminal.

7. The device of claim 6, wherein the voltage sense element comprises a plurality of diodes, each diode being coupled to one of the voltage input terminals.

8. The device of claim 6, further comprising a current source coupled to the gate terminal and the voltage sense element.

9. The device of claim 8, wherein the current source comprises a transistor.

10. The device of claim 8, further comprising a gain element coupled between the current source and the gate terminal to amplify at least a portion of the current generated by the current source.

11. The device of claim 10, wherein the gain unit comprises a transistor.

12. The device of claim 1, further comprising a steering diode coupled between each of the interface line terminals and the shared protection device.

13. The device of claim 1, further comprising at least one protection resistor coupled to each of the interface line terminals.

14. The device of claim 1, wherein the shared protection device comprises:
a voltage sense element coupled to the voltage input terminals to generate the negative reference voltage;
a protection element having a gate terminal coupled to the voltage sense element and a first terminal coupled to the interface line terminals; and
a current source coupled to the gate terminal and the voltage sense element.

15. The device of claim 14, wherein the shared protector further comprises a gain element coupled between the current source and the gate terminal to amplify at least a portion of the current generated by the current source.

16. The device of claim 1, further comprising a plurality of protection diodes, each coupled to one of the line interface terminals and operable to ground the associated interface terminal responsive to a voltage on the associated interface terminal exceeding a threshold voltage of the protection diode.

17. A protection circuit, comprising:
a plurality of voltage input terminals and a plurality of pairs of interface line terminals; and
a shared protection device coupled to all of the pairs of interface line terminals and operable to sense a negative reference voltage representing a most negative one of the voltages present on the voltage input terminals and to provide negative overvoltage protection by grounding all of the pairs of interface line terminals responsive to a voltage on at least one of the interface line terminals exceeding the negative reference voltage in a negative direction.

18. The circuit of claim 17, wherein the shared protection device comprises:
a voltage sense element coupled to the voltage input terminals to generate the negative reference voltage;
a protection element having a gate terminal coupled to the voltage sense element and a first terminal coupled to the interface line terminals; and
a current source coupled to the gate terminal and the voltage sense element.

19. A method for protecting a device including a plurality of subscriber line interface circuits each having a voltage input terminal and first and second interface line terminals, comprising:
dynamically sensing a negative reference voltage representing a most negative one of the voltages present on the voltage input terminals; and
grounding the first and second interface line terminals of all of the subscriber line interface circuits responsive to a voltage on at least one of the interface line terminals exceeding the negative reference voltage in a negative direction.

* * * * *